(12) United States Patent
Leighton

(10) Patent No.: US 8,960,237 B2
(45) Date of Patent: Feb. 24, 2015

(54) FUEL TANK INSTALLATION

(71) Applicant: Airbus Operations Limited, Bristol (GB)

(72) Inventor: David Leighton, Bristol (GB)

(73) Assignee: Airbus Operations Limted, Bristol (GB)

( * ) Notice: Subject to any disclaimer, the term of this patent is extended or adjusted under 35 U.S.C. 154(b) by 202 days.

(21) Appl. No.: 13/654,800

(22) Filed: Oct. 18, 2012

(65) Prior Publication Data
US 2013/0092267 A1    Apr. 18, 2013

(30) Foreign Application Priority Data
Oct. 18, 2011 (GB) .................................. 1117941.3

(51) Int. Cl.
| B64D 37/06 | (2006.01) |
| F02M 37/04 | (2006.01) |
| B64D 37/10 | (2006.01) |
| B64D 37/00 | (2006.01) |

(52) U.S. Cl.
CPC .............. B64D 37/10 (2013.01); B64D 37/005 (2013.01); *Y02T 50/44* (2013.01)
USPC ............... 137/899.2; 137/565.17; 244/135 R; 417/423.15

(58) Field of Classification Search
USPC .......... 137/565.17, 899.2; 417/423.15, 423.8; 244/135 R
See application file for complete search history.

(56) References Cited

U.S. PATENT DOCUMENTS

| 2,139,373 | A | * | 12/1938 | McKinley et al. | 417/423.6 |
| 2,306,297 | A | * | 12/1942 | Curtis | 96/214 |
| 2,382,412 | A | * | 8/1945 | Grey et al. | 244/135 R |
| 2,394,154 | A | * | 2/1946 | Curtis et al. | 222/383.2 |
| 2,408,918 | A | * | 10/1946 | Curtis | 222/240 |
| 2,872,084 | A | * | 2/1959 | Edwards | 417/423.15 |
| 2,978,150 | A | * | 4/1961 | Doelcher | 417/423.15 |
| 3,000,543 | A | * | 9/1961 | Paul | 417/423.15 |
| 5,181,838 | A | * | 1/1993 | Sato et al. | 417/423.15 |
| 5,275,538 | A | * | 1/1994 | Paliwoda et al. | 417/423.15 |
| 5,375,651 | A | * | 12/1994 | Colwell | 417/423.8 |
| 7,252,482 | B2 | * | 8/2007 | Walker et al. | 417/423.8 |
| 2010/0322797 | A1 | * | 12/2010 | Lawyer et al. | 417/423.15 |
| 2012/0006943 | A1 | | 1/2012 | Courpet et al. | |

FOREIGN PATENT DOCUMENTS

| GB | 766447 | 1/1957 |
| GB | 804390 | 11/1958 |
| GB | 939888 | 10/1963 |

OTHER PUBLICATIONS

UK Search Report for GB Application No. 1117941.3, dated Jan. 30, 2012.

* cited by examiner

*Primary Examiner* — John Rivell
(74) *Attorney, Agent, or Firm* — Nixon & Vanderhye P.C.

(57) ABSTRACT

A fuel tank installation comprising: a fuel tank for holding fuel, the fuel tank comprising a fuel tank wall formed with a hole; a fuel pump assembly fitted into the hole in the fuel tank wall with an inner part of the fuel pump assembly protruding from an inner side of the hole and an outer part of the fuel pump assembly protruding from an outer side of the hole; a cage surrounding the outer part of the fuel pump assembly; and a mounting piece which attaches both the cage and the fuel pump assembly to the fuel tank wall.

15 Claims, 5 Drawing Sheets

FUEL TANK INSTALLATION

This application claims priority to GB Application No. 1117941.3, filed 18 Oct. 2011, the entire contents of which is hereby incorporated by reference.

FIELD OF THE INVENTION

The present invention relates to a fuel tank installation comprising a fuel tank and a fuel pump assembly.

BACKGROUND OF THE INVENTION

Fuel pump assemblies are commonly used in aircraft fuel systems to transfer fuel from one fuel tank to another and to supply engines with a stream of fuel. Such fuel pump assemblies are commonly mounted on the lower cover of a wing, as shown in WO2007/071908. In this known arrangement the pump assembly is located within a fuel filled canister mounted on the inside of the wing cover.

This arrangement allows the pump assembly to be well protected within the fuel tank region between the wing covers. However, it weakens the lower cover of the wing and necessitates local structural reinforcement. Also, a complex cooling arrangement is required to cool the electric motor and pumping unit.

SUMMARY OF THE INVENTION

A first aspect of the present invention provides a fuel tank installation comprising: a fuel tank wall formed with a hole; a fuel pump assembly fitted into the hole in the fuel tank wall with an inner part of the fuel pump assembly protruding from an inner side of the hole and an outer part of the fuel pump assembly protruding from an outer side of the hole; a cage surrounding the outer part of the fuel pump assembly; and a mounting piece which attaches both the cage and the fuel pump assembly to the fuel tank wall.

Locating the two parts of the fuel pump assembly on opposite sides of the hole enables the outer part of the fuel pump assembly to be located outside the fuel tank where it can be more easily cooled.

Instead of mounting the fuel pump assembly and the cage separately to the wall, they are both attached to the wall by a common mounting piece. This minimises the number of fasteners required and thus minimizes weight, assembly time and the risk of fuel leaking through any fastener holes. Also, the mounting piece provides a thermal connection between the fuel pump assembly and the cage, enabling the cage to act as a heat sink for the fuel pump assembly.

The mounting piece may be attached to the fuel tank wall by tension fasteners, or by any other suitable attachments means.

The pump assembly may be attached to the mounting piece by tension fasteners, or by any other suitable attachment means.

The fuel tank installation may further comprise a canister surrounding the inner part of the fuel pump assembly, wherein the mounting piece is attached to an outer side of the fuel tank wall by tension fasteners and the canister is attached to an inner side of the fuel tank wall by the same tension fasteners.

The mounting piece typically surrounds the fuel pump assembly, and may be an annular mounting ring.

The mounting piece may comprise a body portion which is attached to the cage; an inner flange extending inwardly from the body portion and attached to the fuel pump assembly; and an outer flange extending outwardly from the body portion and attached to the fuel tank wall.

The cage may be attached to the mounting piece by a bayonet type connection. Such a bayonet fitting allows the cage to be quickly and easily removed for inspection or maintenance of the pump assembly, and eliminates the need for mechanical fasteners. In this way assembly and maintenance time are reduced as well as the weight and part count of the installation.

The fuel tank installation may further comprise a gasket disposed between the mounting piece and the fuel tank wall. The gasket may act as a heat shield to reduce the transfer of heat generated by the fuel pump assembly from the mounting piece into the fuel tank wall. The fuel tank wall may be formed from a fibre-reinforced composite material, such as carbon-fibre reinforced polymer (CFRP), and the use of a heat-resistant gasket is particular preferred in such a case.

The fuel pump assembly may comprises a pump which is positioned partially or entirely inside the inner side of the hole.

The fuel pump assembly may comprise an electric motor which is positioned partially or entirely outside the outer side of the hole.

If necessitated by the technology used for the electric motor, an electronics unit may be housed within the cage, or outside the cage and connected to the motor by control wiring passing through the cage.

The pump typically comprises an impeller which is rotated when in use by the electric motor.

The electric motor and pump may be housed within a casing which is fitted into the hole in the fuel tank wall with an inner part of the casing protruding from an inner side of the hole and an outer part of the casing protruding from an outer side of the hole. The casing may have an annular flange which is attached to the mounting piece.

A second aspect of the invention provides a kit of parts which can be fitted to a fuel tank wall to form an installation according to the first aspect, the kit of parts comprising:
a) a fuel pump assembly with an inner part and an outer part;
b) a cage which can be fitted to surround the outer part of the fuel pump assembly; and
c) a mounting piece comprising a body portion which can be attached to the cage; an inner flange extending inwardly from the body portion which can be attached to the fuel pump assembly; and an outer flange extending outwardly from the body portion which can be attached to the fuel tank wall.

A third aspect of the present invention provides an aircraft comprising: a fuselage; a pair of spars extending from the fuselage; a first cover attached to and extending between the spars; a second cover attached to and extending between the spars; a fuel pump assembly fitted into a hole in one of the spars with an inner part of the fuel pump assembly protruding from an inner side of the hole and an outer part of the fuel pump assembly protruding from an outer side of the hole; a cage surrounding the outer part of the fuel pump assembly; and a mounting piece which attaches both the cage and the fuel pump assembly to the one of the spars.

The spar is typically a spar in a wing, horizontal tail plane or vertical tail plane of the aircraft.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
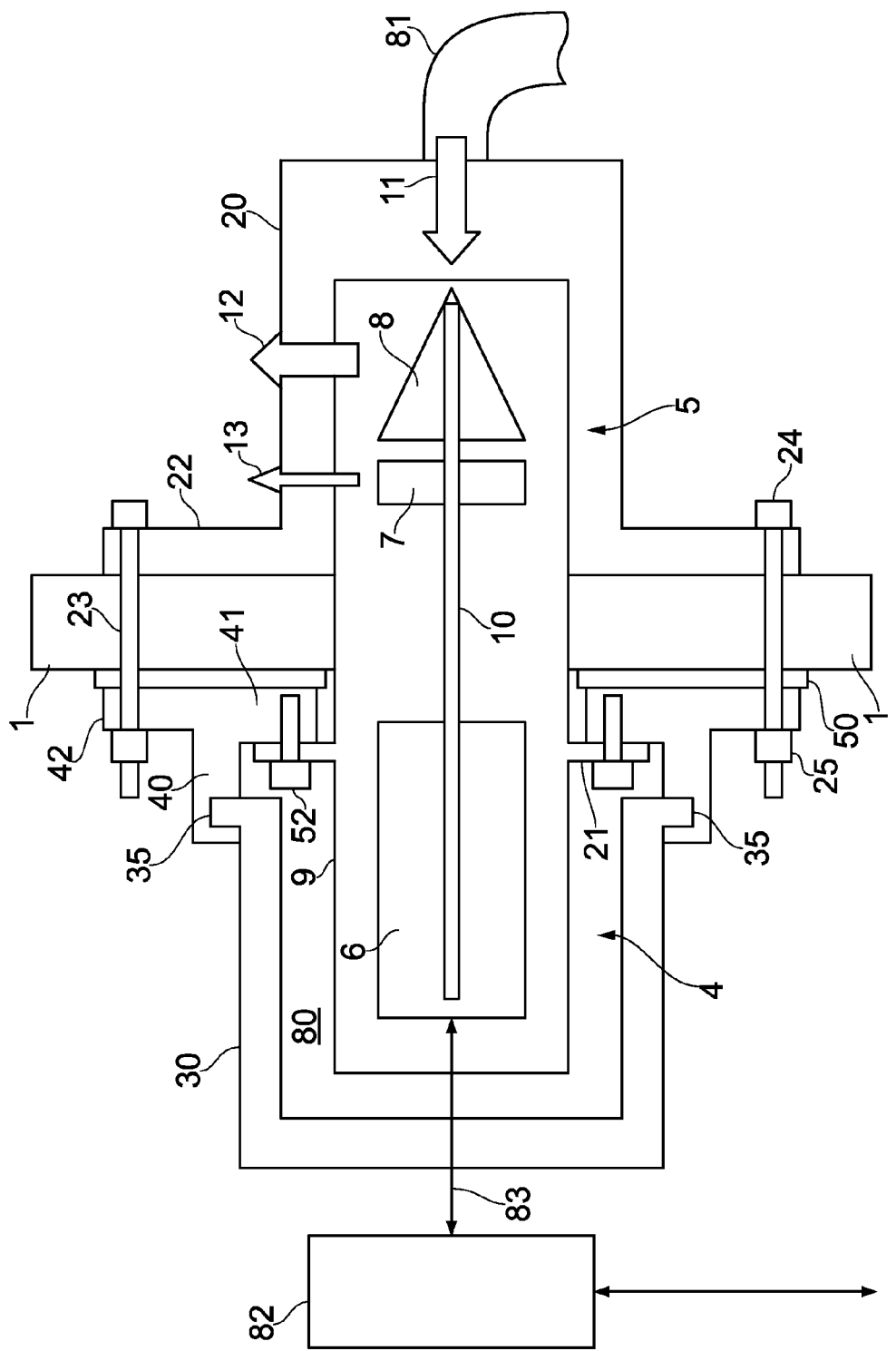
FIG. 1 is a schematic sectional side view of a fuel tank installation.
Figure 2:
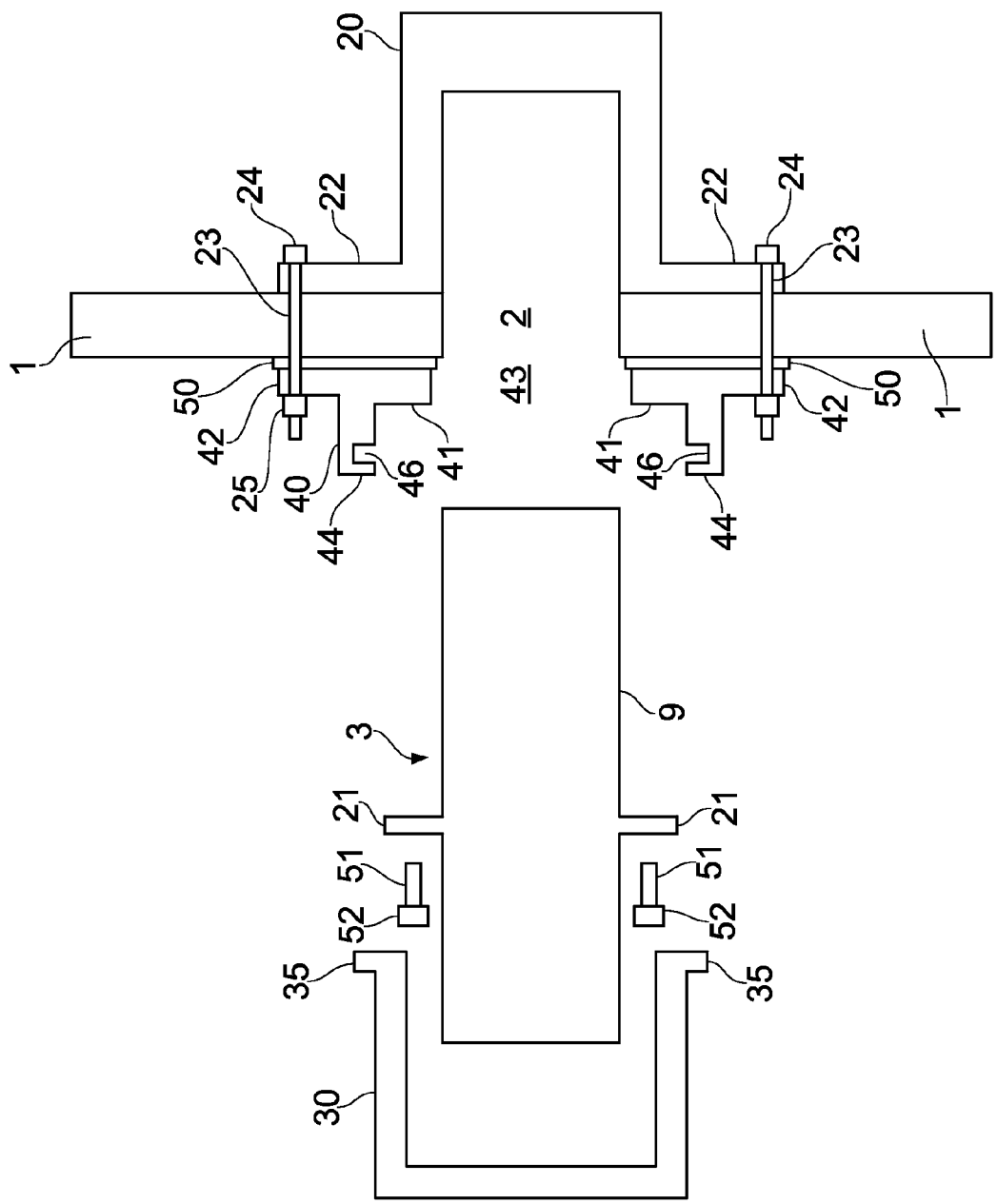
FIG. 2 is a schematic sectional side view of the fuel tank installation of FIG. 1 in a partially disassembled state.

A fuel tank installation shown in FIG. 1 is formed from a kit of parts shown in FIG. 2. The installation comprises a fuel tank wall 1 formed with a hole 2 shown in FIG. 2. A fuel pump assembly 3 is fitted into the hole 2 as shown in FIG. 1 with an inner part 5 protruding to the right from an inner side of the hole 2 and an outer part 4 protruding to the left from an outer side of the hole 2.

The fuel pump assembly comprises a 7 kW electric motor 6 which is positioned outside (that is, to the left of) the outer side of the hole 2, and a pump 7, 8 which is positioned inside (that is, to the right of) the inner side of the hole 2. The pump comprises a ring impeller 7 and a main impeller 8 carried on a rotary shaft 10 which is rotated when in use by the electric motor 6.

The electric motor 6 and pump 7, 8 are housed within a casing 9 which engages the sides of the hole 2. The casing 9 has an inlet (not shown) for admitting fuel 11 into the pump from the fuel tank; a main outlet (not shown) for outputting fuel 12 from the main impeller 8 towards the aircraft's engines; and a subsidiary outlet (not shown) for outputting air or fuel 13 from the ring impeller 7 back into the tank. The ring impeller 7 is able to pump either air or fuel, whereas the main impeller 8 can pump fuel only. The function of the ring impeller 7 is to prime the main impeller 8.

A snorkel 81 leads from the inlet to the low point of the tank, in order to feed fuel from the low point of the tank into the pump.

A canister 20 surrounds the inner part of the fuel pump assembly. The canister 20 is fully sealed against the fuel tank wall 1 by means of an O-ring incorporated into a flange 22 of the canister and oversealing the assembly with fuel resistant sealant (not shown). The canister 20 along with the wall 1 forms a boundary between the interior of the fuel tank (on the right-hand side of FIG. 1) and the exterior of the fuel tank (on the left-hand side of FIG. 1). The canister 20 has openings (not shown) to admit the fluid 11, 12, 13 to pass to/from the pump.

Figure 3:
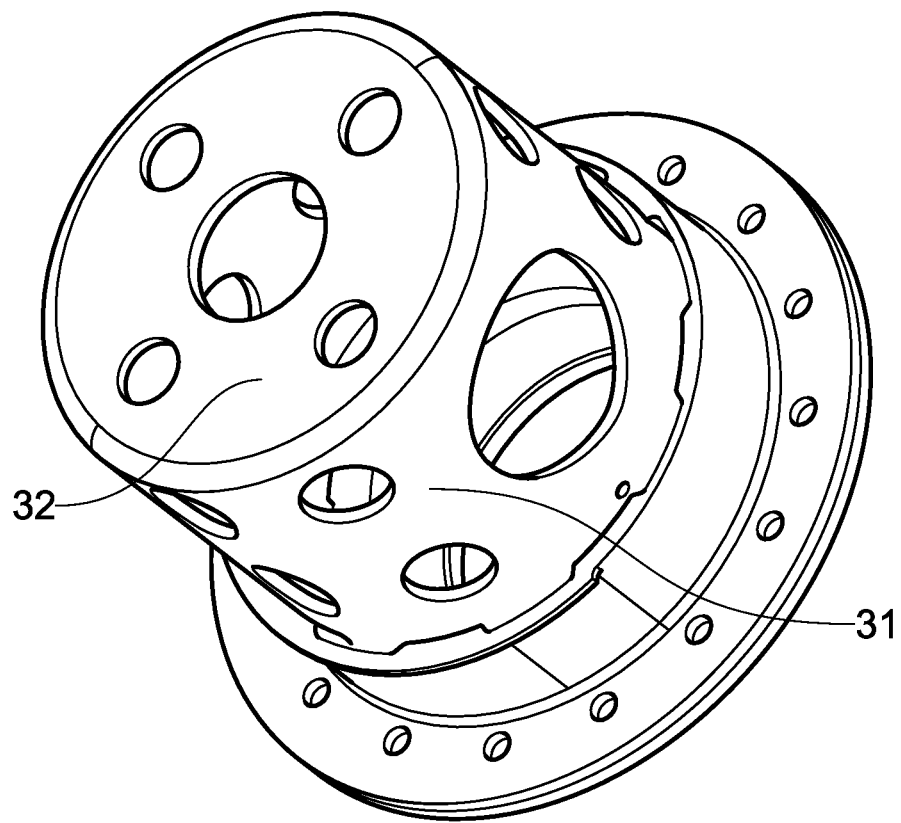
FIG. 3 is an isometric view of the cage and mounting ring.

A metal cage 30 surrounds the outer part 4 of the fuel pump assembly. The cage 30 has a cylindrical body 31, an end wall 32 and four lugs 35 (shown in FIGS. 1 and 2) spaced around the circumference of its open end. The body 31 and end wall 32 are formed with multiple air holes as shown in FIG. 3.

An electronics unit 82 is housed outside the cage and connected to the motor 6 by control wiring 83 passing through one of the five holes in the end wall 32 of the cage. The unit 82 contains switching electronics that control the motor 6 and also, if required, the electronics required to convert power from ac to dc.

A mounting ring attaches the fuel pump assembly 3 and the cage 30 to the fuel tank wall 1. The mounting ring has a body portion 40 which is attached to the cage 30; an annular inner flange 41 extending inwardly from the body portion and attached to an annular flange 21 of the fuel pump casing 9; an annular outer flange 42 extending outwardly from the body portion 40 and attached to the fuel tank wall 1; and a central hole 43 for receiving the fuel pump assembly.

Figure 4:
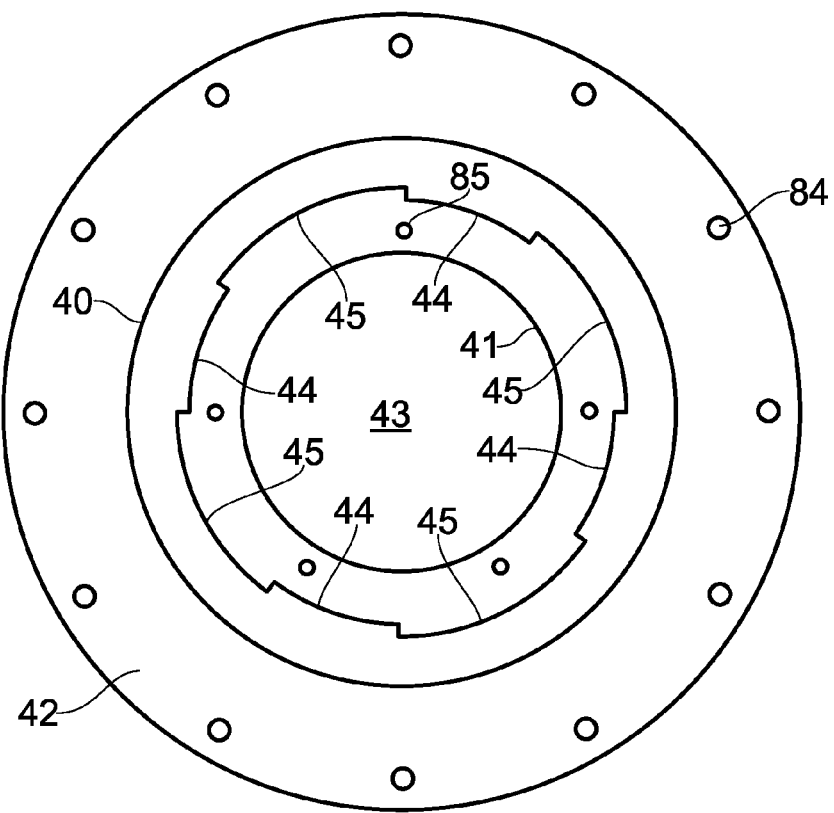
FIG. 4 is an end view of the mounting ring, viewed from the left-hand side of FIG. 1.

The body portion 40 is attached to the cage 30 by a bayonet fitting shown in FIG. 4. The body portion 40 has four tabs 44 and gaps 45 around its circumference. Each tab 44 has a recess 46 behind it (shown in FIG. 2) which is sized to receive a corresponding lug 35 of the cage 30. The cage is inserted into the body portion 40 of the mounting ring with the lugs 35 of the cage 30 aligned with the gaps 45, and then rotated so that the lugs are secured within the recesses 56. One or more mechanical fasteners (not shown) are then installed to prevent the cage from rotating and detaching.

The kit of parts is assembled as shown in FIG. 1 by the following sequence of steps.

1. The canister 20 has an annular flange 22 with twelve pre-formed holes (not shown) which are aligned with pre-formed holes (not shown) in the wall 1.
2. Bolts 23 are passed through the pre-formed holes until the heads 24 of the bolts engage the canister flange 22.
3. A heat resistant gasket 50 with pre-formed holes (not shown) is fitted as shown in FIG. 1 with the bolts 23 passing through the holes in the gasket.
4. The flange 42 of the mounting ring has pre-formed holes 84 (shown in FIG. 4) and is fitted as shown in FIG. 1 with the bolts 23 passing through the holes in the flange 42.
5. Nuts 25 are screwed onto the bolts 23 and tightened to place the bolts in tension. Thus the flange 42 of the mounting ring 42 is firmly attached to an outer side of the fuel tank wall 1 by the bolts 23 and the canister 20 is firmly attached to an inner side of the fuel tank wall by the same bolts 23.
6. The fuel pump assembly 3 is inserted into the hole 2 until the flange 21 of the casing 9 engages the flange 41 of the mounting ring.
7. The flange 41 of the mounting ring and the flange 21 of the casing 9 both have four pre-formed holes (the holes 85 in the flange 41 being shown in FIG. 4). The fuel pump assembly is rotated until these holes are aligned.
8. Screws 51 are screwed into the pre-formed holes until the heads 52 of the screws engage the flange 21.
9. The screws 51 are tightened to place them in tension so that the flange 21 and the flange 41 are tightly engaged.
10. The cage 30 is fitted to the body 40 with the bayonet fitting as described above. Thus the mounting ring directly engages both the cage 30 and the fuel pump assembly 3, and attached them both to the fuel tank wall 1.

By attaching the fuel pump assembly 3 and the cage 30 to the wall 1 using a common mounting ring, the number of fasteners passing through or into the wall 1 of the fuel tank is minimised, therefore reducing the weight and complexity of the wall and reducing stress concentrations in the wall.

The bayonet fitting between the cage 30 and the mounting ring allows the cage to be quickly and easily removed for inspection or maintenance of the pump assembly, and eliminates the need for mechanical fasteners, except for one retaining fastener required to prevent the cage from rotating. In this way assembly and maintenance time are reduced as well as the weight and part count of the assembly.

The mounting ring body 40 and flange 41 also provide a conductive thermal connection between the fuel pump assembly 3 and the cage 30, enabling the cage to act as a heat sink for the fuel pump assembly. Additional convective cooling is provided by the air holes in the cage 30. The gasket 50 acts to insulate the fuel tank wall from heat generated by the motor 6.

Figure 5:
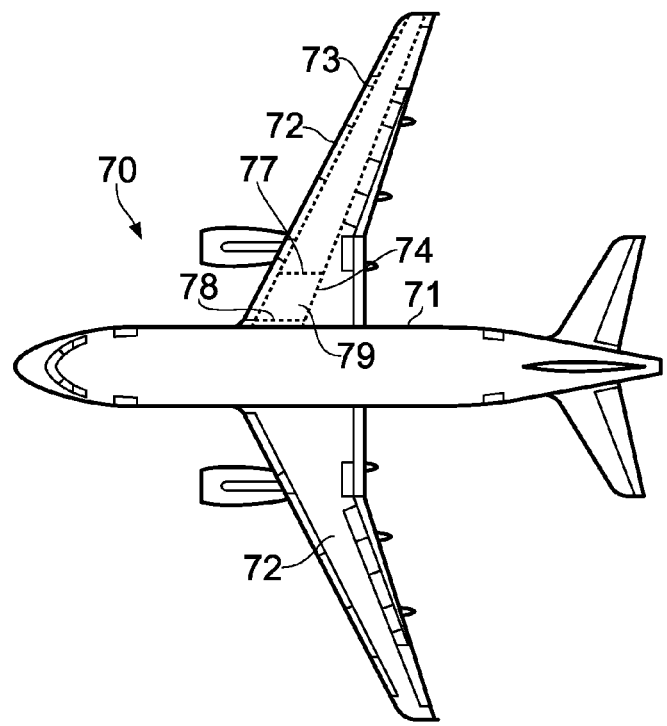
FIGS. 5 and 6 are plan and front views of an aircraft.
Figure 6:
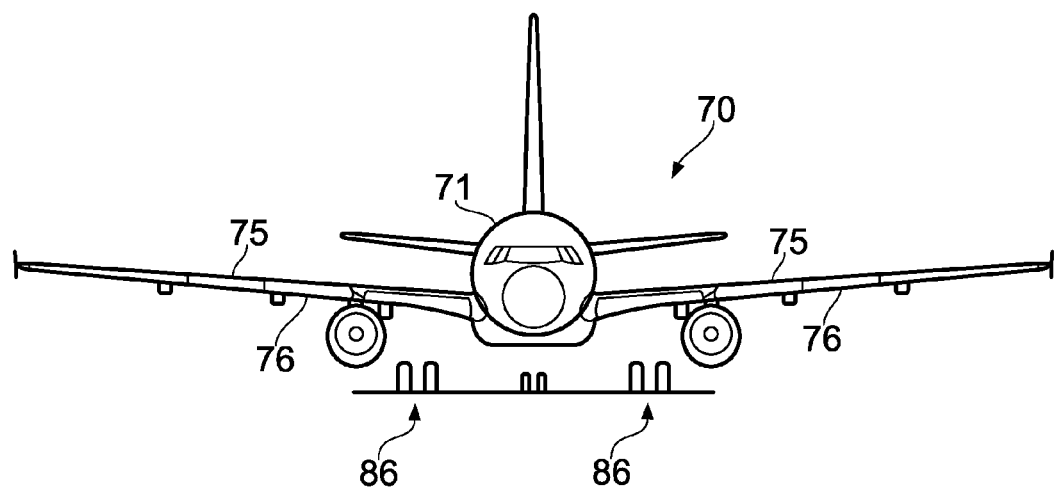

The installation of FIG. 1 is typically installed on an aircraft 70 of the kind shown in FIGS. 5 and 6. The aircraft comprises a fuselage 71 and a pair of wings 72. The main structural element of each wing 72 is a wing box comprising a pair of spars extending from the fuselage. The approximate position of the spars is indicated by dashed lines 73, 74 in FIG. 5. Each wing also has an upper cover 75 attached to and extending between the spars and a lower cover 76 attached to and extending between the spars (see FIG. 6). The spars 73, 74 form the fore and aft walls of a fuel tank 79, the covers 75, 76 form the upper and lower walls of the fuel tank 79, and ribs 77, 78 form the outboard and inboard walls of the fuel tank 79.

In a preferred embodiment of the invention the rear spar 74 constitutes the fuel tank wall 1 shown in FIG. 1, and the fuel pump assembly is fitted into a landing gear bay, proximate one of the wing landing gears 86 shown in FIG. 6. In the event that a tire of one of the landing gears 76 bursts, then the cage 30 protects the pump assembly from impact by tire debris. An air gap 80 between the cage 30 and the casing 9 enables the cage 30 to deflect and absorb such an impact without contacting the casing 9.

Although the invention has been described above with reference to one or more preferred embodiments, it will be appreciated that various changes or modifications may be made without departing from the scope of the invention as defined in the appended claims.

The invention claimed is:

1. A fuel tank installation comprising:
a) a fuel tank wall formed with a hole;
b) a fuel pump assembly fitted into the hole in the fuel tank wall with an inner part of the fuel pump assembly protruding from an inner side of the hole and an outer part of the fuel pump assembly protruding from an outer side of the hole;
c) a cage surrounding the outer part of the fuel pump assembly; and
d) a mounting piece which attaches both the cage and the fuel pump assembly to the fuel tank wall.

2. The installation of claim 1 wherein the mounting piece is attached to the fuel tank wall by tension fasteners.

3. The assembly claim 2 further comprising a canister surrounding the inner part of the fuel pump assembly, wherein the mounting piece is attached to an outer side of the fuel tank wall by said tension fasteners and the canister is attached to an inner side of the fuel tank wall by said tension fasteners.

4. The installation of claim 1 wherein the mounting piece comprises a mounting ring which surrounds the fuel pump assembly.

5. The installation of claim 1 wherein the mounting piece comprises a body portion which is attached to the cage; an inner flange extending inwardly from the body portion and attached to the fuel pump assembly; and an outer flange extending outwardly from the body portion and attached to the fuel tank wall.

6. The installation of claim 1 wherein the pump assembly is attached to the mounting piece by tension fasteners.

7. The installation of claim 1 wherein the cage is attached to the mounting piece by a bayonet type connection.

8. The installation of claim 1 further comprising a gasket disposed between the mounting piece and the fuel tank wall.

9. The installation of claim 1 wherein the fuel pump assembly comprises a pump which is positioned at least partially inside the inner side of the hole.

10. The installation of claim 1 wherein the fuel pump assembly comprises an electric motor which is positioned at least partially outside the outer side of the hole.

11. The installation of claim 9 wherein the fuel pump assembly comprises an electric motor positioned at least partially outside the outer side of the hole and the electric motor and pump are housed within a casing which is fitted into the hole in the fuel tank wall with an inner part of the casing protruding from an inner side of the hole and an outer part of the casing protruding from an outer side of the hole.

12. The installation of claim 9 wherein the fuel pump assembly comprises an electric motor positioned at least partially outside the outer side of the hole and the pump comprises an impeller which is rotated by said electric motor.

13. The installation of claim 1 wherein the cage is formed with two or more air holes.

14. A kit of parts configured to be fitted to a fuel tank wall forming an installation according to claim 1.

15. An aircraft comprising: a fuselage; a pair of spars extending from the fuselage; a first cover attached to and extending between the spars; a second cover attached to and extending between the spars; a fuel pump assembly fitted into a hole in one of the spars with an inner part of the fuel pump assembly protruding from an inner side of the hole and an outer part of the fuel pump assembly protruding from an outer side of the hole; a cage surrounding the outer part of the fuel pump assembly; and a mounting piece which attaches both the cage and the fuel pump assembly to the one of the spars.

\* \* \* \* \*